June 26, 1934.　　　S. M. KNUDSEN　　　1,964,519
ADJUSTABLE SEAT CONSTRUCTION
Filed July 21, 1933
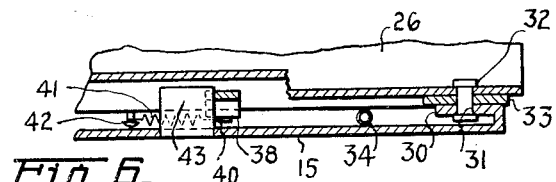
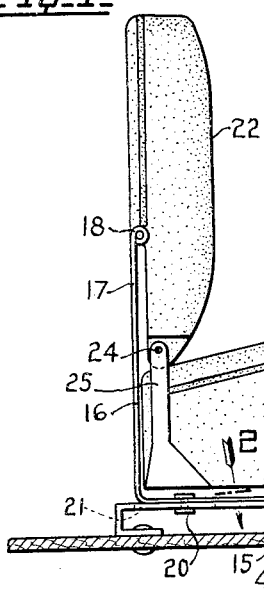
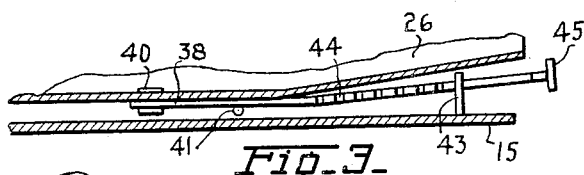
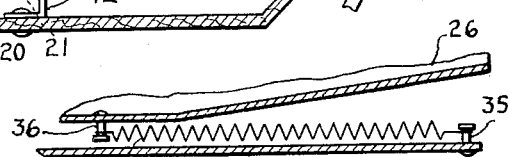
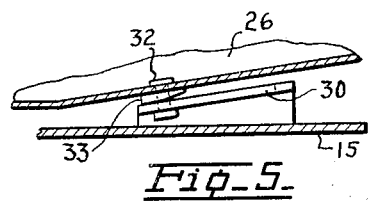
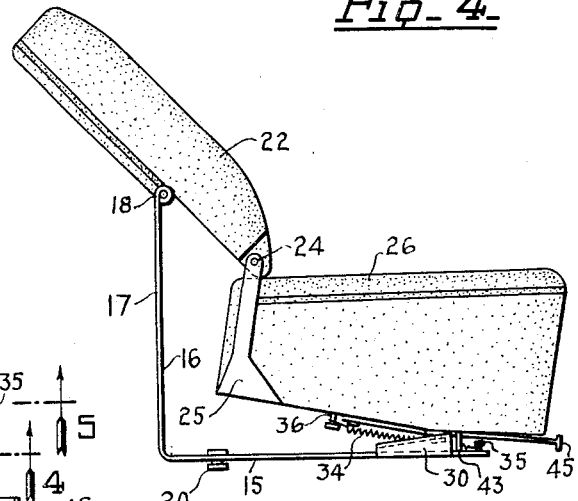
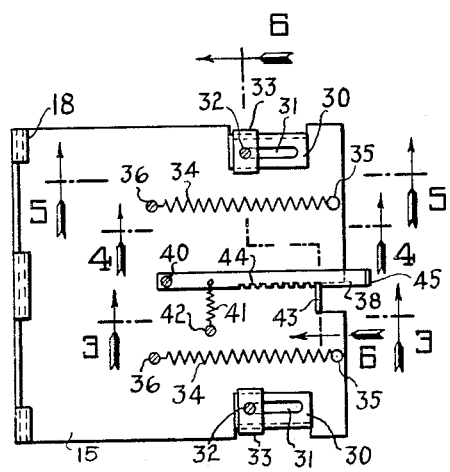
INVENTOR.
Sterling M. Knudsen
BY Daniel G. Cullen
ATTORNEY.

Patented June 26, 1934

1,964,519

UNITED STATES PATENT OFFICE 1,964,519

ADJUSTABLE SEAT CONSTRUCTION

Sterling M. Knudsen, Page, Nebr.

Application July 21, 1933, Serial No. 681,441

2 Claims. (Cl. 155—116)

This invention relates to adjustable seat constructions.

The principal object of the present invention is to provide an adjustable seat construction which can be manipulated by the operator to draw the seat proper or the horizontal part thereof forward and simultaneously to tilt the seat back or vertical part thereof, in effect forming a reclining seat.

Other objects of the invention will presently appear upon reference to the appended drawing showing an embodiment of the same. In this drawing;

Fig. 1 is a vertical section through an automobile floor board showing an embodiment of the invention, in association with automobile parts;

Fig. 2 is a horizontal section as if on line 2—2 of Fig. 1;

Figs. 3, 4, 5, and 6 are sections as if on the corresponding lines of Fig. 2;

Fig. 7 is a view similar to that of Fig. 1 but with parts omitted, and with other parts shown in a reclining seat position.

Referring to the drawing wherein like numerals refer to like parts, it will be seen that in Fig. 1, there is shown a vehicle floor board 10 through which projects a manipulating pedal 11. Secured to the floor board are rails 12 upon which rests the horizontal base portion 15 of an L shaped plate, referenced generally 16, this plate having a vertical back portion 17 whose upper edge is provided with piano-hinge loops 18 for purposes to be described.

The plate base 15 is provided with buttons 20 which are disposed in elongated slots 21 of the rails 12 to provide a horizontal adjustment for the position of the plate 16 and the seat carried thereby, as a whole, with respect to the floor board and the pedal of the automobile. Means for effecting such movement are not shown, since such means are well known.

Connected to the upper edge of the plate back 17 by a piano hinge including the loops 18 is a seat back 22. The lower edge of this part is pivotally connected, at 24 to brackets 25 embracing the seat base 26 and this part is thus suspended from the piano hinge at 18.

The forward part of the seat base 26 is supported on inwardly turned wings 30, bent up from the plate base 15, and slotted as at 31 to provide slide ways for buttons 32 projecting downwardly from lugs 33 secured to the lower surface of the seat base 26 to permit the latter to slide horizontally along the rails 30, it being observed that the rails 30 are inclined forwardly and upwardly so that forward movement of the seat base 26 is accompanied by upward movement of the same.

For effecting horizontal movement of the seat base 26 with respect to the plate 16, there is provided a mechanism including a pair of springs 34 anchored at their forward ends 35 to the plate base 15 and at their rear ends 36 to the lower surface of the seat base 26 and locking means comprising a bar 38 disposed under the seat 26 and pivotally secured thereto at 40, and influenced by a tension spring 41, anchored at 42 to the seat base 26, towards a lug 43 bent up from the plate base 15, the bar 38 having in its edge notches 44 which may engage the lug 43 to lock the parts in position.

The operation of the construction can readily be observed from the foregoing. Normally the parts are in the position of Fig. 1 with the seat base 26 horizontal and with the seat back 22 vertical. When it is desired to change the position of the parts to that shown in Fig. 7, the operator grasps the handle 45 of the rod 38 and moves it towards the right of Fig. 6 to free its notches 44 from the lug 43. By utilizing his feet, and by taking advantage of the influence of the springs 34, the operator may cause the seat base 26 to move forward and to the right of Fig. 1 and into the position of Fig. 7. The rear edge of the seat base 26 will rise and the lower edge of the seat back 22 will move forwardly and upwardly, in accordance with the influence of the connections 24 and 25, and the seat parts will assume the position of Fig. 7.

It will be observed that the degree of inclination of the back 22 may be varied by changing the distance between the hinge at 18 and the plate base 15. Such change may be effected during manufacture, or by making the plate back 17 in two parts having a relatively telescoping connection, provided with suitable clamps.

Now having described an embodiment of the invention, reference is had to the following claims which determine the scope thereof.

1. In vehicle seat constructions, the combination of a fixed structure, an L-shaped plate of considerable width connected thereto so as to be slidable horizontally therealong, a horizontal seat base of the width of said plate, means slidably and pivotally connecting the seat base to the horizontal part of the plate so that the seat base may be moved horizontally along the plate and may also be rocked out of its horizontal plane, a vertical seat back of the width of said plate hingedly connected at its lower edge to the rear edge of the horizontal seat base so that the diedral angle between them may be altered, and a hinge connection between the vertical part of the plate and the vertical seat back at the upper edge of the former and considerably below the upper edge of the latter, means constantly tending to move the horizontal seat base horizontally along the horizontal part of the plate, away from the vertical part thereof, and manipulable means for locking the seat base against such movement.

2. In vehicle seat constructions, the combination of a fixed structure, an L-shaped unitary metal plate connected thereto so as to be slidable horizontally therealong, a horizontal seat base, means slidably and pivotally connecting the seat base to the horizontal part of the plate so that the seat base may be moved horizontally along the plate and may also be rocked out of its horizontal plane, a vertical seat back hingedly connected at its lower edge to the rear edge of the horizontal seat base so that the diedral angle between them may be altered, and a hinge connection between the vertical part of the plate and the rear surface of the vertical seat back at the upper edge of the former and considerably below the upper edge of the latter, means constantly tending to move the horizontal seat base horizontally along the horizontal part of the plate, and away from the vertical part thereof, and manipulable means for locking the seatbase against such movement.

STERLING M. KNUDSEN.